US012784256B2

(12) United States Patent
Schlesiger et al.

(10) Patent No.: US 12,784,256 B2
(45) Date of Patent: Nov. 3, 2026

(54) METHOD AND APPARATUS FOR DETERMINING THE POSITION OF CURVED ARTICLES AND FOR SADDLING SUCH ARTICLES

(71) Applicants: NORDISCHER MASCHINENBAU RUD. BAADER GMBH + CO. KG, Lübeck (DE); FPI FOOD PROCESSING INNOVATION GMBH & CO. KG, Lübeck (DE)

(72) Inventors: Oliver Schlesiger, Lübeck (DE); Fabian Isernhagen, Lübeck (DE); Tim Struve, Lübeck (DE)

(73) Assignees: NORDISCHER MASCHINENBAU RUD. BAADER GMBH + CO. KG, Lübeck (DE); FPI FOOD PROCESSING INNOVATION GMBH & CO. KG, Lübeck (DE)

( * ) Notice: Subject to any disclaimer, the term of this patent is extended or adjusted under 35 U.S.C. 154(b) by 212 days.

(21) Appl. No.: 18/720,381

(22) PCT Filed: Dec. 17, 2021

(86) PCT No.: PCT/EP2021/086575
§ 371 (c)(1),
(2) Date: Jun. 14, 2024

(87) PCT Pub. No.: WO2023/110135
PCT Pub. Date: Jun. 22, 2023

(65) Prior Publication Data

US 2025/0045948 A1 Feb. 6, 2025

(51) Int. Cl.
*G06T 7/70* (2017.01)
*B25J 9/16* (2006.01)
(Continued)

(52) U.S. Cl.
CPC ............... *G06T 7/70* (2017.01); *B25J 9/1612* (2013.01); *G06T 7/0004* (2013.01); *G06V 10/30* (2022.01);
(Continued)

(58) Field of Classification Search
CPC .................... G06T 7/70; G06T 7/0004; G06T 2207/10028; G06T 2207/20182;
(Continued)

(56) References Cited

U.S. PATENT DOCUMENTS 11,030,763 B1 * 6/2021 Srivastava ............. G06V 20/64
2010/0323599 A1 12/2010 Hiddink et al.
(Continued)

FOREIGN PATENT DOCUMENTS

CN 111915732 A * 11/2020
EP 3178742 A1 6/2017
(Continued)

OTHER PUBLICATIONS

Wang et al, Point-Based Rendering for Homogeneous Participating Media with Refractive Boundaries, IEEE Transactions on Visualization and Computer Graphics, vol. 24, No. 10, Oct. 2018 2743 (Year: 2018).*

(Continued)

*Primary Examiner* — Andrae S Allison
(74) *Attorney, Agent, or Firm* — Dinsmore & Shohl LLP

(57) ABSTRACT

Disclosed herein are methods and apparatuses for determining positions of food processing curved articles and saddling such articles. The methods include scanning the article by a detection device to generate point cloud data representing the article spatial surface structure and selecting a central point. The methods include determining a partial point cloud from the points within a predefined distance around the central point and calculating the partial point cloud principal
(Continued)

orientation for two spatial directions by determining the two associated spatial position vectors. The methods include calculating a partial surface normal vector based on the determined spatial position vectors that is perpendicular to both vectors and marking partial point cloud points as processed. The methods include repeating such steps until a predefined proportion is processed. The methods include selecting a predefined number of calculated partial surface normal vectors and calculating overall orientation of the article by determining a normal vector based on selected partial surface normal vectors.

23 Claims, 5 Drawing Sheets

(51) Int. Cl.
*G06T 7/00* (2017.01)
*G06V 10/30* (2022.01)

(52) U.S. Cl.
CPC ............... *G06T 2207/10028* (2013.01); *G06T 2207/20182* (2013.01); *G06T 2207/30128* (2013.01)

(58) Field of Classification Search
CPC .. G06T 2207/30128; G06T 2207/20021; B25J 9/1612; G06V 10/30
See application file for complete search history.

(56) References Cited

U.S. PATENT DOCUMENTS

| | | | | |
|---|---|---|---|---|
| 2011/0102435 | A1* | 5/2011 | Brabec | G06T 15/08 345/424 |
| 2014/0357172 | A1* | 12/2014 | Peters | A22C 21/0023 452/149 |
| 2017/0249401 | A1* | 8/2017 | Eckart | G06V 10/7625 |
| 2020/0017314 | A1* | 1/2020 | Rose | B25J 15/0608 |
| 2020/0043186 | A1* | 2/2020 | Selviah | G06T 7/33 |
| 2021/0174529 | A1* | 6/2021 | Srivastava | G06V 20/64 |

FOREIGN PATENT DOCUMENTS

| | | | | |
|---|---|---|---|---|
| JP | WO 2007083602 | | * | 1/2007 |
| TW | 201643811 | A | * | 12/2016 |
| WO | 2021073562 | A1 | | 4/2021 |
| WO | 2021082229 | A1 | | 5/2021 |

OTHER PUBLICATIONS

Kim Jaewoong et al., Structured light camera base 3D visual perception and tracking application system with robot grasping task 2013 IEEE International Symposium on Assembly and Manufacturing, Jul. 30, 2013 (Jul. 30, 2013). pp. 187-192 DOI: 10.I 109/ISAM.2013.6643524 XP032513313.

Misimi Ekrem et al. "GRIBBOT—Robotic 3D vision-guided harvesting of chicken fillets" Computers and Electronics in Agriculture, Elsevier, Amsterdam, NL, vol. 121, Dec 29, 2015 (Dec. 29, 2015), pp. 84-100 DOI: 10.1016/J.COMPAG.2015.11.021 ISSN: 0168-1699, XP029423664.

* cited by examiner

METHOD AND APPARATUS FOR DETERMINING THE POSITION OF CURVED ARTICLES AND FOR SADDLING SUCH ARTICLES

CROSS-REFERENCE TO RELATED APPLICATIONS

This application is the U.S. National Stage of PCT/EP2021/086575 filed on Dec. 17, 2021, the entire content of is incorporated herein by reference in it's entirety.

FIELD OF THE INVENTION

The present invention relates to a method for determining the position of curved articles in the food processing industry. The invention also relates to a method for saddling curved articles in the food processing industry. The invention further relates to an apparatus for determining the position of curved articles in the food processing industry and to an arrangement for automatically saddling curved articles in the food processing industry.

Such methods, apparatus and arrangements are used in the automatic processing of articles in the food processing industry, in particular in the processing of such articles with a curved, that is to say, non-planar surface. To be able to process the said articles by machine, preferably fully automatically, first it is necessary to automatically determine their location and their position in space in order to then feed them to the further handling process, with knowledge of the spatial orientation where appropriate. It is usually necessary to saddle the articles on support bodies for further processing in order to fix them detachably in a desired position during the handling process and/or to change their spatial orientation during processing and adapt them to the respective processing step.

Such methods, apparatus and arrangements are used in particular in the processing of poultry carcasses or parts thereof. Articles in the food processing industry are, in particular, poultry breast caps or similar.

BACKGROUND OF THE INVENTION

Until now in the food-processing industry such curved articles have generally been saddled on the aforementioned support bodies by hand. The articles are provided to an employee so that he/she can assess their position in space by inspecting them and then manually saddle them on a suitable support body in the desired spatial orientation.

Therefore, up to now, the spatial position of such curved articles has always been assessed by deploying personnel. On the one hand, such an approach stands in the way of fully automated processing of the said articles and, on the other hand, requires considerable human effort. Another disadvantage is that there is a high risk of injury to personnel when saddling articles by hand, especially where large throughputs are required.

It is therefore the task of the present invention to propose a method for precisely and reliably determining the position of curved articles in the food processing industry. It is furthermore the task of the invention to propose a corresponding apparatus. It is also the task of the present invention to propose a method whereby the said articles are picked up fully automatically and optimally aligned and positioned on a support body. A further task of the present invention is to propose a corresponding arrangement.

The task is solved by a method with the features mentioned hereinbefore, the method according to the invention comprising the following steps: a) scanning the article by means of a detection device adapted to generate point cloud data representing the spatial surface structure of the article; b) selecting a central point from the point cloud data and determining a partial point cloud from the points of the point cloud data whose positions lie within a predefined distance around the central point; c) calculating the principal orientation of the partial point cloud for at least two spatial directions in the partial point cloud by determining the two associated spatial position vectors; d) calculating a partial surface normal vector describing a partial surface based on the determined spatial position vectors that is perpendicular to both spatial position vectors; e) marking the points in the point cloud data present in the partial point cloud as already processed points and repeating steps b) to d) for further points of the point cloud data which are not marked as already processed points until a predefined proportion of the points have been processed; f) selecting a predefined number of the calculated partial surface normal vectors and calculating the overall orientation of the article by determining a normal vector based on the selected partial surface normal vectors.

SUMMARY OF THE INVENTION

The method according to the invention offers the advantage that, as a result, the spatial position of one of the said articles is described by a single normal vector calculated by the method according to the invention. This normal vector is perpendicular to an imaginary plane that best approximates the principal orientation of the curved article. If the said article has a convex side, as is the case, for example, with poultry breast caps, the normal vector calculated by the method according to the invention is perpendicular to the imaginary plane, said plane being, for example, tangential to the outermost point of the convex side of the article and oriented in such a way that it is parallel to the principal axes describing the position of the curved article.

The calculated normal vector thus describes the spatial direction in which the article has the greatest average curvature. Thus, for each article with a curved surface, the calculated normal vector represents a measure for determining the position, in particular the spatial orientation of the curved surface of the said article. The position of the said articles can thus be determined precisely and automatically and with high repeat accuracy using the normal vector.

The articles are preferably scanned by optical means, the detection device, for example a photonic mixer device, being adapted for this purpose. This offers the advantage that articles are scanned contactlessly in order to generate the point cloud data representing the spatial surface structure of that article. On the one hand, such photonic mixer devices map the surface of the scanned article in three dimensions by means of the said point cloud data and, on the other hand, they also provide an amplitude signal that optically reproduces the surface of the scanned article.

According to the invention, a central point is first selected from the cloud data to generate the normal vector for each of the articles. In other words, a point is singled out from the point cloud. Around this central point, all those points are now selected whose position lies within a given distance around the central point. From these selected points, the aforementioned partial point cloud is then determined in step b). In step c), the principal orientation of the partial point cloud is now calculated for at least two of the said spatial directions. The principal orientation is preferably determined by principal component analysis. For this purpose, the said spatial position vectors corresponding to the at least two spatial directions are calculated.

Based on the determined spatial position vectors, a partial surface normal vector is then calculated which is perpendicular to the said two spatial position vectors and thus also to the partial surface. The partial surface normal vector is preferably determined by calculating the cross product of the said two spatial position vectors.

An advantageous embodiment of the invention is characterised in that the central points are randomly selected. Consequently, the positions of the respective partial point clouds are also selected at random. This makes it possible to generate the said partial point clouds from the point cloud without linking the selection of the associated partial point cloud centres to any rigid target. However, because the central points are randomly selected, it is always ensured that, on average, the positions of the selected partial point clouds are distributed as evenly as possible over the entire point cloud.

A preferred further development of the invention is characterised in that the centre of gravity of the point cloud is determined taking into account all points of the point cloud data, and that, when selecting the calculated partial surface normal vectors, those with the shortest distance between the central point and the centre of gravity are selected.

The targeted selection of those partial surface normal vectors whose central point lies in the aforementioned area surrounding the centre of gravity means that only those selected partial surface normal vectors which lie close to the centre of gravity have an influence on the determination of the normal vector. This has a particularly positive effect in the case of articles where the mass distribution is such that the most massive areas are located in the area surrounding the centre of gravity and decrease towards the edges of the article, as is the case with poultry breast caps, for example. The breast fillet usually has the greatest meat thickness in the area around the centre of gravity, decreasing towards the peripheral areas.

A preferred further development of the invention is characterised in that only a predefined number of partial surface normal vectors are used to determine the normal vector. In this way, the required computational effort can be reduced to a minimum without negatively affecting the precision of the position determination. Depending on the application, it is possible to define those areas of the point cloud in which partial surface normal vectors are used to determine the normal vector, which thus represents an overall normal vector.

As described above, when processing poultry breast caps, for example, it is advantageous to use a predefined number of partial surface normal vectors around the centre of gravity for this purpose. Depending on the articles' geometry, other selection criteria for the partial surface normal vectors can be defined beforehand, thus allowing sufficiently accurate position determination despite the limited selection of partial surface normal vectors.

A further advantageous embodiment of the invention is characterised in that the spatial coordinates of the points present in the partial point cloud are rendered mean-free. For this purpose, preferably the mean values $\mu_x$, $\mu_y$, $\mu_z$ of all x, y and z coordinates of the points of the partial point cloud are calculated, and the mean values $\mu_x$, $\mu_y$, $\mu_z$ are subtracted from the respective point coordinates so as to render the points or point coordinates mean-free. This significantly reduces the algorithmic complexity of the required vector calculation.

A preferred further development of the invention is characterised in that, to calculate the partial surface normal vector, a covariance matrix of the mean-free spatial coordinates is computed or calculated, whose eigenvalues are determined, wherein the associated eigenvectors are calculated for the two largest eigenvalues and form the at least two associated spatial position vectors for the principal orientation of the partial point cloud.

Preferably, the eigenvalues of the covariance matrix of all data points of the partial point cloud are determined in order to calculate the said associated spatial position vectors. The eigenvalues $\lambda_1$, $\lambda_2$, . . . $\lambda_n$ are calculated by solving the eigenvalue problem $(C-\lambda E)\cdot v=0$, where C denotes the covariance matrix and E the unit matrix. The control variable n here denotes the total number of eigenvalues existing for the eigenvalue problem. For the largest eigenvalues in each case, the associated eigenvectors, that is to say, the associated spatial position vectors for the principal orientation of the partial point cloud, are then determined.

A further advantageous embodiment of the invention is characterised in that points in the point cloud data whose distance from the detection device exceeds a predefined maximum distance are masked out. In this way, the article is differentiated from the background and, at the same time, the size of the point cloud is reduced, so that the necessary computational effort is also reduced. In other words, only those areas in which the respective article is actually located are considered for the generation of point cloud data.

A preferred further development of the invention is characterised in that the point cloud data undergoes noise filtering. This has a beneficial effect on the precision of the position determination of articles in the food processing industry. Such noise filtering can be accomplished in different ways, preferably by scaling the depth information captured by the detection device. Such scaling is preferably carried out as a function of the amplitude measured by the detection device. This can be achieved, for example, by calculating the quotient with the measured amplitude. The measured amplitude corresponds to the optical properties of the article surface, for example the brightness of the scanned surface.

A further advantageous embodiment of the invention is characterised in that the degree of noise filtering depends on the distance of the respective points of the point cloud data from the detection device. This offers the advantage that, despite noise suppression, the distance information or depth information needed to determine the position of the article is not lost.

As mentioned hereinbefore, the task is also solved by the method according to the invention for the automatic saddling of curved articles in the food processing industry. The method comprises the following steps: Providing at least one support body adapted to receive and hold the article and calculating the overall orientation of the article by determining a normal vector by means of the previously described method for determining the position of curved articles in the food processing industry. The method further comprises the following steps: Moving a controllable gripper towards the article, the gripper being moved at any rate against the direction of the normal vector before it comes into contact with the article, actuating controllably movable gripping elements of the gripper to pick up and hold the article, moving the gripper together with the article towards the support body, arranging the article on the support body by means of the gripper and actuating the controllably movable gripping elements to release the article arranged on the support body. The method according to the invention makes it possible to pick up articles with a curved surface geometry precisely and securely by means of the gripper and to place them fully automatically on a support body. This avoids the previously necessary deployment of personnel and saves the personnel costs that would otherwise be incurred. It also avoids the inherent risk of injury to personnel when saddling articles manually.

A further advantageous embodiment of the invention is characterised in that the articles are poultry breast caps which are arranged with their visceral side on the support body. The poultry breast caps include an outer side where the breast fillets are located and an inner side towards the rib cage, namely the visceral side. The outside is convexly curved. According to the invention, the gripper is moved against the direction of the normal vector to the outside of the poultry breast cap in order to pick it up securely. A multi-axis robot is preferably used to move the gripper.

The task is further solved by the said apparatus for determining the position of curved articles in the food processing industry. This comprises a detection device which is configured and adapted to scan the article to generate point cloud data representing the spatial surface structure of the article.

The apparatus according to the invention also comprises a processing unit, the processing unit being configured to select a central point from the point cloud data and to determine a partial point cloud from the points of the point cloud data whose positions lie within a predefined distance around the central point.

The processing unit is further configured to calculate the principal orientation of the partial point cloud for at least two spatial directions in the partial point cloud by determining the two associated spatial position vectors, to calculate a partial surface normal vector describing a partial surface based on the determined spatial position vectors that is perpendicular to both spatial position vectors, and to mark the points present in the partial point cloud in the point cloud data as already processed points.

The processing unit is also adapted to repeat the aforementioned steps for further points of the point cloud data that are not marked as already processed points, until a predefined proportion of the points has been processed.

The processing unit is further configured to select a predefined number of the calculated partial surface normal vectors and to calculate the overall orientation of the article by determining a normal vector based on the selected partial surface normal vectors.

A further advantageous embodiment of the invention is characterised in that the processing unit comprises a random generator that is adapted to randomly select the central points. The random generator offers the advantage that the positions of the respective partial point clouds are selected at random. This makes it possible to generate the said partial point clouds from the point cloud without linking the selection of the partial point cloud centres to any rigid target. However, due to the central points randomly selected by means of the random generator, it is always ensured that, on average, the positions of the selected partial point clouds are always distributed as evenly as possible over the entire point cloud.

A preferred further development of the invention is characterised in that the processing unit comprises a centre-of-gravity-determining unit that is adapted to determine the centre of gravity of the point cloud, taking into account all points of the point cloud data, and the processing unit further comprises a selection unit which is configured, when selecting the calculated partial surface normal vectors, to select those with the shortest distance between their central point and the centre of gravity.

The centre-of-gravity-determining unit is thus configured and adapted in such a way that the centre of gravity of the point cloud is determined taking into account all points of the point cloud data. From the calculated partial surface normal vectors, the centre-of-gravity-determining unit selects a predefined number of those with the shortest distance between their central point and the centre of gravity. The targeted selection of those partial surface normal vectors whose central point lies in the aforementioned area surrounding the centre of gravity means that those partial surface normal vectors which lie close to the centre of gravity have an influence on the determination of the normal vector.

This has a particularly positive effect in the case of articles where the mass distribution is such that the most massive areas are located in the area surrounding the centre of gravity and decrease towards the edges of the article, as is the case with poultry breast caps, for example. The breast fillet usually has the greatest meat thickness in the area around the centre of gravity, decreasing towards the peripheral areas.

A further useful embodiment of the invention is characterised in that, when selecting the partial surface normal vectors, the selection unit is adapted to use only a predefined number of partial surface normal vectors to determine the normal vector. In this way, the required computational effort can be reduced to a minimum without negatively affecting the precision of the position determination.

Depending on the application, it is possible to define, by means of the selection unit, those areas of the point cloud in which partial surface normal vectors are used to determine the normal vector. As described above, when processing poultry breast caps, for example, it is advantageous to use a predefined number of partial surface normal vectors around the centre of gravity for this purpose by means of the selection unit. Depending on the articles' geometry, other selection criteria for the partial surface normal vectors can be defined beforehand, thus allowing sufficiently accurate position determination despite the limited selection of partial surface normal vectors.

According to a further preferred embodiment, the processing device is configured to render the spatial coordinates of the points present in the partial point cloud mean-free. The processing device is thus configured preferably to calculate the mean values $\mu_x$, $\mu_y$, $\mu_z$ of all x, y and z coordinates of the points of the partial point cloud and to subtract the mean values ux. $\mu_y$, $\mu_z$ from the respective point coordinates in order to render the points or point coordinates mean-free. This significantly reduces the algorithmic complexity of the required vector calculation and considerably reduces the requirements with regard to the computing power to be provided by the processing device.

A further advantageous embodiment of the invention is characterised in that the processing device is configured to determine a covariance matrix of the mean-free spatial coordinates and their eigenvalues in order to calculate the partial surface normal vector, and, for the two largest eigenvalues, is adapted to calculate the associated eigenvectors which form the at least two associated spatial position vectors for the principal orientation of the partial point cloud.

For this purpose, the processing device is preferably adapted to determine the eigenvalues of the covariance matrix of all data points of the partial point cloud in order to calculate the said associated spatial position vectors. The processing device is further adapted to calculate the eigenvalues $\lambda_1, \lambda_2, \ldots \lambda_n$ by solving the eigenvalue problem $(C-\lambda E)\cdot v=0$, where C denotes the covariance matrix and E the unit matrix. The control variable n here denotes the total number of eigenvalues existing for the eigenvalue problem. For the largest eigenvalues in each case, the associated eigenvectors, that is to say, the associated spatial position vectors for the principal orientation of the partial point cloud, are then determined by means of the processing device.

According to another preferred embodiment of the invention, the processing device comprises a masking unit that is adapted to mask out points in the point cloud data whose distance from the detection device exceeds a predefined maximum. This means that the article is better differentiated from the background and, at the same time, the size of the point cloud is reduced, so that the necessary computational effort is also reduced. In other words, only those areas in which the respective article is clearly located are considered for the generation of point cloud data.

A further advantageous embodiment of the invention is characterised in that the processing unit comprises a noise filter that is adapted to subject the point cloud data to noise filtering. This has a beneficial effect on the precision of the position determination of articles in the food processing industry. Such noise filtering can be accomplished in different ways, preferably by scaling the depth information captured by the detection device by means of the processing unit. Such scaling is preferably carried out as a function of the amplitude measured by the detection device. This can be achieved, for example, by calculating the quotient of the depth information and the measured amplitude. The processing device is configured and adapted to carry out the aforementioned noise filtering methods.

A preferred further development of the invention is characterised in that the noise filter is configured to adjust or adapt the degree of noise filtering depending on the distance of the respective points of the point cloud data from the detection device. This offers the advantage that, despite noise suppression, the depth information needed to determine the position of the article is not lost.

The task is further solved by a corresponding arrangement for the automatic saddling of curved articles in the food processing industry. The arrangement according to the invention comprises at least one support body adapted to receive and hold the article, as well as the apparatus described above, which is configured to calculate the overall orientation of the article by determining the normal vector.

The arrangement further comprises a controllably movable gripper that is configured to be movable towards the article, the gripper being moved at any rate against the direction of the normal vector before it comes into contact with the article. The arrangement also has a control device that is adapted to actuate controllably movable gripping elements of the gripper to pick up and hold the article. The control device is adapted to move the gripper together with the article towards the support body, to arrange the article on the support body by means of the gripper and to actuate the controllably movable gripping elements to release the article arranged on the support body.

The arrangement according to the invention makes it possible to pick up articles with a curved surface geometry precisely and securely by means of the gripper and to place them fully automatically on a support body. This entirely avoids the previously necessary deployment of personnel and saves the personnel costs that would otherwise be incurred. It also avoids the inherent risk of injury to personnel when saddling articles manually.

A further advantageous embodiment of the invention is characterised in that the articles are poultry breast caps which are arranged with their skeleton side, or visceral side, on the support body. In this context, reference is made to the previously mentioned advantages of the present invention in the processing of poultry breast caps.

A preferred further development of the invention is characterised in that the gripping elements are configured as flank grippers and are adapted to grip the article laterally. Combining the movement of the gripping element against the direction of the normal vector ensures that the gripping element approaches the curved article from an optimal gripping direction in order to then reliably pick it up laterally by means of the gripping elements.

A further advantageous embodiment of the invention is characterised in that the gripping elements are configured and adapted like tongs to swivel in a controllable fashion about a common axis of rotation. Advantageously, the article is thereby securely gripped on both sides and picked up without risk of losing it.

A preferred further development of the invention is characterised in that the gripping elements are adapted to be driven in a pneumatically controlled manner. This offers the advantage that the components needed to drive the gripping elements are as compact as possible and, in particular, meet the stricter hygiene requirements applicable in the food sector.

Another advantageous embodiment of the invention is characterised in that the gripper comprises a support element adapted to come into contact with the breast side of the poultry breast cap. The additional support element offers the advantage of additional support or stabilisation of the poultry breast cap that has been picked up while it is held by the gripper. The two gripping elements together with the support element form a three-fingered gripping unit.

BRIEF DESCRIPTION OF THE DRAWINGS

Further useful and/or advantageous features and embodiments of the invention are described in the description. Particularly preferred embodiments are explained in more detail with reference to the attached drawing. The drawing shows the following.

DETAILED DESCRIPTION OF THE INVENTION

Figure 1:
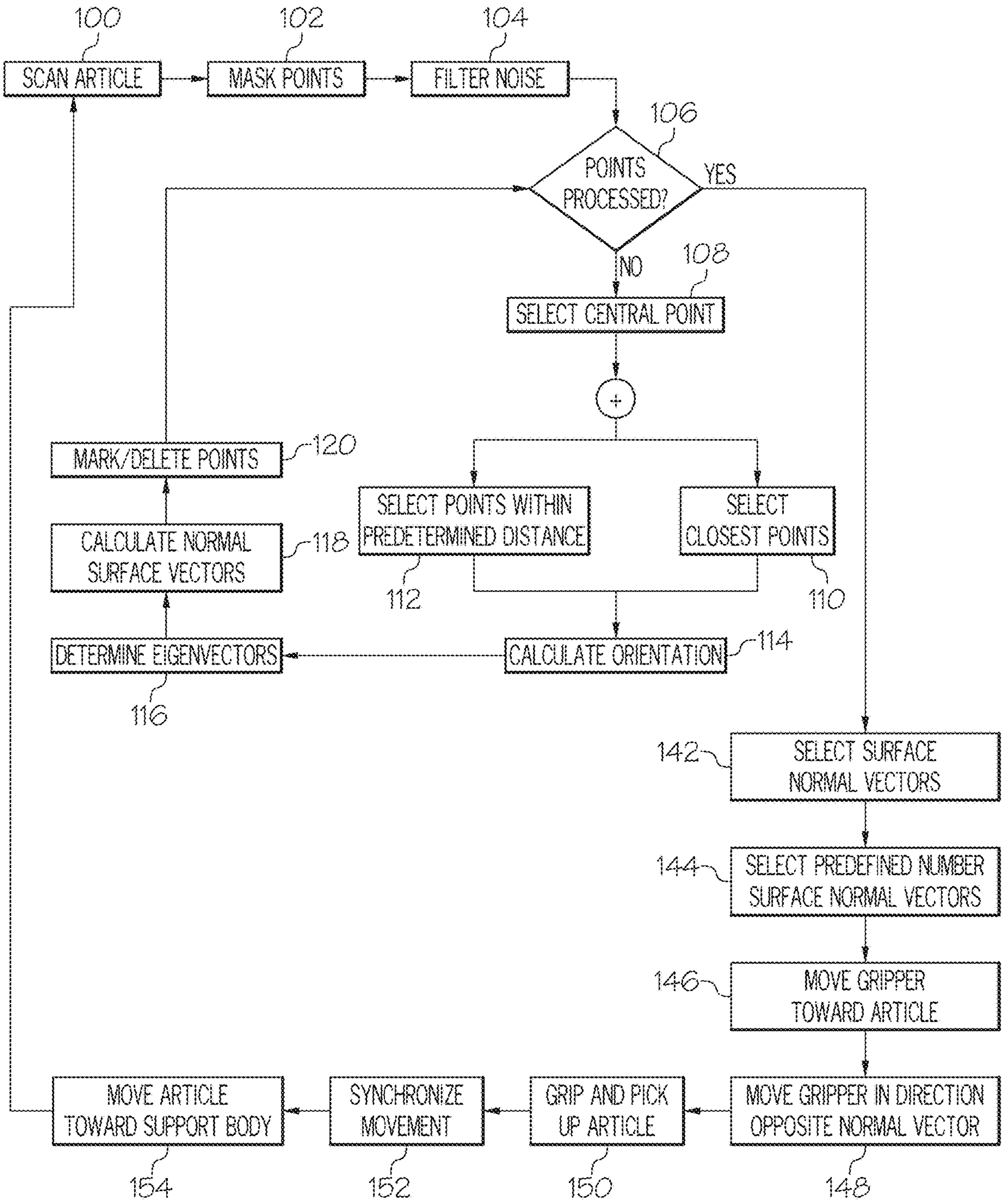
FIG. 1 is a schematic representation of a flow chart.

The methods, arrangements and apparatus according to the invention are described in more detail below, with reference to the drawing.

FIG. 1 shows a schematic flow chart on the basis of which the method according to the invention and the apparatus for determining the position of curved articles in the food processing industry are described in more detail. The following description of the process steps also serves to explain the functioning of the detection device and the processing unit of the apparatus according to the invention. The flow chart is also used to explain the method according to the invention and the arrangement for automatically saddling the said articles.

First, the article is scanned in the scanning step 100 by means of a detection device adapted to generate point cloud data representing the spatial surface structure of the article. The detection device is preferably a photonic mixer device. Such a device is configured to generate three-dimensional depth maps based on phase differences of the reflected wave fronts. It also provides an amplitude signal that is generated by optically scanning the article.

However, the present invention is not limited solely to the use of such a photonic mixer device. Rather, any matrix distance measuring system that is adapted to provide distance information and optionally also amplitude information concerning the scanned article can be used.

This is followed by the selection 108 of a central point from the point cloud data and determination 110, 112 of a partial point cloud from the points of the point cloud data, their positions lying within a predefined distance around the central point. Preferably, in the determination step 110, a predefined number of points lying closest around the central point are selected from the point cloud data. Further preferably, in the determination step 112, alternatively those points which lie within the said predefined distance around the central point are selected.

Subsequently, the step of calculating 114 the principal orientation of the partial point cloud is carried out for at least two spatial directions in the partial point cloud by determining the two associated spatial position vectors. The characteristic proportions of the spatial directions in the partial point cloud are preferably determined in a similar way to the principal component analysis. Put simply, the quasi-spherical partial point cloud is thereby reduced to an area whose position in space corresponds to the principal orientation of the partial point cloud. For the purposes of the present invention, quasi-spherical means a point cloud with a number of discrete points located within an elliptical or spherical imaginary enveloping surface.

The eigenvalues of the covariance matrix of all data points of the partial point cloud are determined, for example, in order to calculate the said associated spatial position vectors. The eigenvalues $\lambda_1, \lambda_2, \ldots \lambda_n$ are calculated by solving the eigenvalue problem $(C-\lambda E)\cdot v=0$, where C denotes the covariance matrix and E the unit matrix. The eigenvalues and eigenvectors are determined in step 114. In step 116, the associated eigenvectors are determined for the largest eigenvalues in each case, which are referred to in the following as spatial position vectors or vectors for short.

In step 118, a partial surface normal vector describing the partial surface, which is perpendicular to both spatial position vectors, is calculated on the basis of the determined spatial position vectors. The partial surface normal vector is preferably determined by calculating the cross product of the two aforementioned spatial position vectors.

Subsequently, in step 120, points present in the partial point cloud are marked as already processed points in the point cloud data. Optionally, the point data of the partial point cloud can also be deleted from the point cloud data.

In step 106, it is checked whether a predefined proportion of the points has been processed, that is to say, whether a sufficient number of points of the point cloud have already been processed. If the number of points of the point cloud processed by means of the aforementioned steps is below the predefined proportion, the aforementioned steps, starting with the selection 108 of a central point, are repeated until the check in step 106 shows that the processed number of points of the point cloud exceeds the predefined proportion of all points.

After the aforementioned termination condition occurs, in step 144 a predefined number of the calculated partial surface normal vectors is selected and the overall orientation of the article is calculated by determining a normal vector based on the selected partial surface normal vectors. The normal vector is preferably determined by averaging the selected partial surface normal vectors. Preferably, in step 108, the central points are randomly selected.

Further preferably, in particular the partial surface normal vectors whose respective central point lies closest to a centre of gravity calculated from point cloud data are selected. In other words, when determining the normal vector, those partial surface normal vectors are taken into account which are at the shortest distance from the centre of gravity of the article, that is to say, those partial surface normal vectors whose distance from the respective centre of gravity is shorter than the specified distance.

These partial surface normal vectors are optionally selected in a step 142 before step 144. This prevents partial surfaces that lie further towards the periphery in relation to the article's centre of gravity from influencing the orientation of the normal vector, resulting in a more numerically stable calculation process. This has a particularly positive effect if the curved articles have a mass distribution that decreases towards the edge, as is the case with poultry breast caps, for example. In these articles, the largest amount of meat is located centrally around the centre of gravity and steadily decreases towards the edges due to the decreasing breast fillet thickness.

Further preferably, only a predefined number of partial surface normal vectors is used to determine the normal vector. In particular—as described above-those partial surface normal vectors that lie close to the centre of gravity are taken into account.

The spatial coordinates of the points present in the partial point cloud are preferably rendered mean-free before the eigenvalues and spatial position vectors are determined from the eigenvectors in step 114. For this purpose, preferably the mean values $\mu_x$, $\mu_y$, $\mu_z$ of all x, y, and z coordinates of the points of the partial point cloud are calculated, and the mean values $\mu_x$, $\mu_y$, $\mu_z$ are subtracted from the respective point coordinates in order to render the points or point coordinates mean-free.

The covariance matrix of the mean-free spatial coordinates is therefore preferably determined in order to calculate the partial surface normal vector. Consequently, for the covariance matrix the following applies:

$$C = \mathrm{cov}(X-\mu_x,\ Y-\mu_y,\ Z-\mu_z),$$

where X, Y and Z denote coordinate vectors formed from the x, y and z coordinates of the points of a respective sub-point cloud, that is to say $X=(x_1, x_2 \ldots, x_N)^T$.

$Y=(y_1, y_2 \ldots, y_N)^T$.

$Z=(z_1, z_2 \ldots, z_N)$ T.

where N denotes the number of points of a partial point cloud.

The eigenvalues are preferably determined as described above, only with the difference that the mean-free covariance matrix described above is used as the starting point for solving the eigenvalue problem $$(C-\lambda E)\cdot v=0$$

Preferably, in a preceding step 102, points in the point cloud data whose distance from the detection device exceeds a predefined maximum distance are masked out. Alternatively, in step 102, it is also possible to mask out all point cloud data lying outside a predefined range of values. In this way, point cloud data are masked out and possible interference from background or foreground artefacts is avoided, thereby increasing the precision and reliability of the position determination. Such background or foreground artefacts can be due, for example, to machine parts that are in the detection range of the detection device but whose distance from it is outside the range relevant for scanning the article surface.

Further preferably, the point cloud data undergo noise filtering 104. This is done, for example, by scaling the depth information calculated by means of the detection device. For example, the depth information provided by the detection device is divided by the amplitude measured by it. Alternatively, other noise filters known from signal processing are used. Alternatively, noise filtering 104 may take place before step 102. This has the advantage that fewer point cloud data are taken into account in the noise filtering, thereby reducing the necessary computational effort.

A further advantageous embodiment of the invention is characterised in that the degree of noise filtering 104 depends on the distance of the respective points of the point cloud data from the detection device. For example, in the case of points closer to the detection device, the noise filtering 104 may be adapted to provide a lower level of noise suppression, whereas in the case of points further away from the detection device, a higher level of noise suppression may be chosen.

Alternatively, it is possible to define the degree of noise suppression 104 as a function of the distance of the respective point from the detection device. For this purpose, for example, a predefined function can be used that determines a corresponding noise suppression level for each distance of a point from the detection device.

Figure 2:
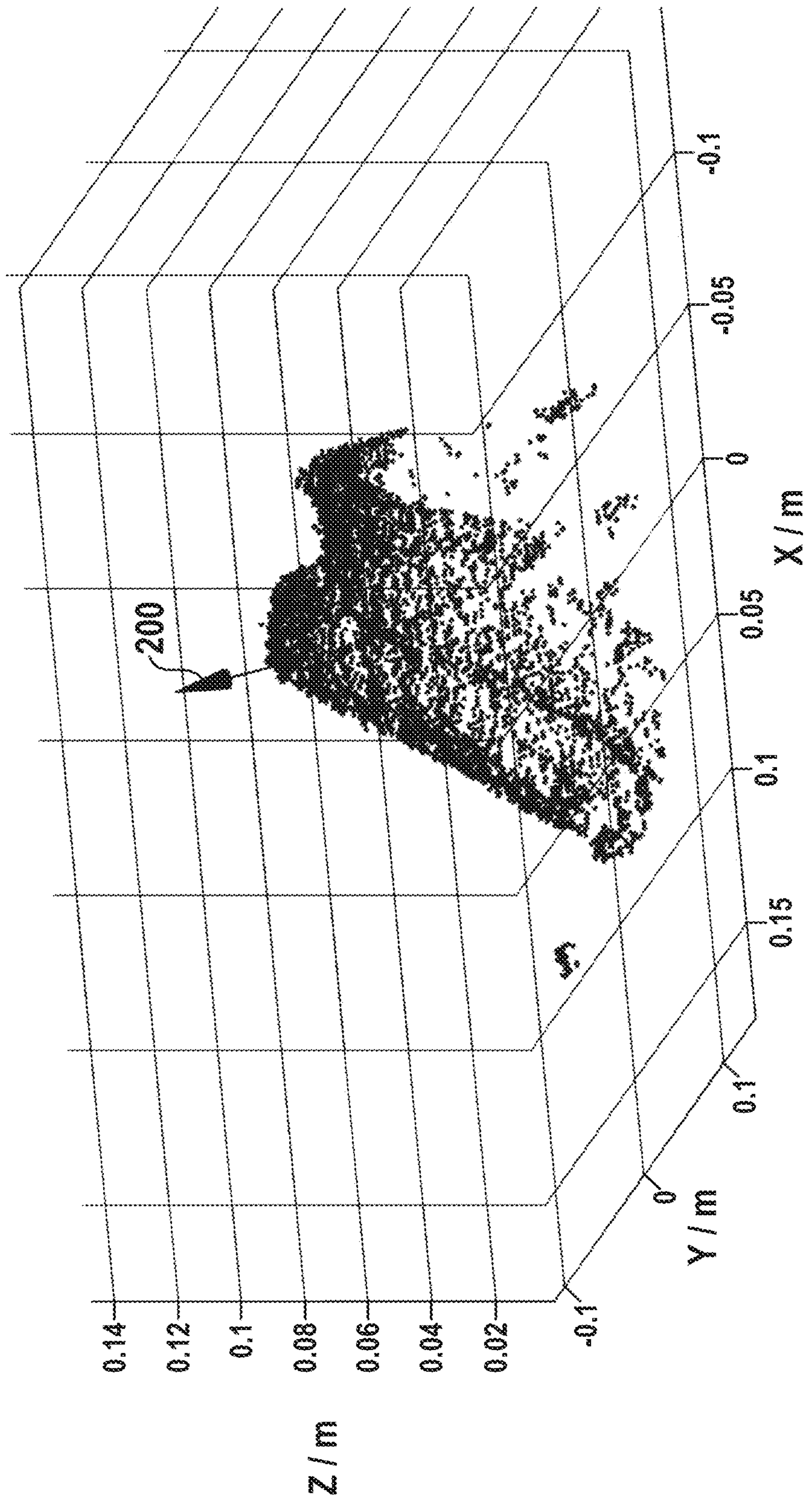
FIG. 2 is a three-dimensional view of the point cloud.

FIG. 2 shows a three-dimensional representation of the point cloud generated by the detection device using the example of a poultry breast cap. FIG. 2 also shows the normal vector 200 determined by the method according to the invention and the apparatus according to the invention, which is perpendicular to a plane optimally imagined on the curved surface of the article. As shown in FIG. 2, the normal vector 200 is directed away from the convex outer surface of the article.

As described at the outset, the present invention also includes a method for automatically saddling curved articles in the food processing industry. To be able to grip and pick up such articles in an automated process, first it is always necessary to determine their position in space with the previously described method and the apparatus according to the invention.

For this purpose, at least one support body—not shown in the drawing—is provided which is adapted to pick up and hold the article. Such support bodies adapted to the geometry of the article are already sufficiently known from the state of the art. For example, when processing poultry breast caps, saddle elements adapted to the geometry of the abdominal cavity are used as support bodies.

These are generally configured in such a way that they engage essentially by positive-locking contact with the respective article, thereby forming a force fit. This ensures that, on the one hand, the article is securely fixed to the support body during subsequent processing and, on the other hand, can be released from it again after processing. A plurality of support bodies are preferably used, which are part of a conveyor system whereby the support bodies are continuously conveyed in a conveying direction.

Before the respective article can be saddled on the support body, it is first necessary to calculate the overall orientation of the article by determining the said normal vector 200. This is done by the method described above and by means of the apparatus according to the invention for determining the position of curved articles in the food processing industry.

Figure 3:
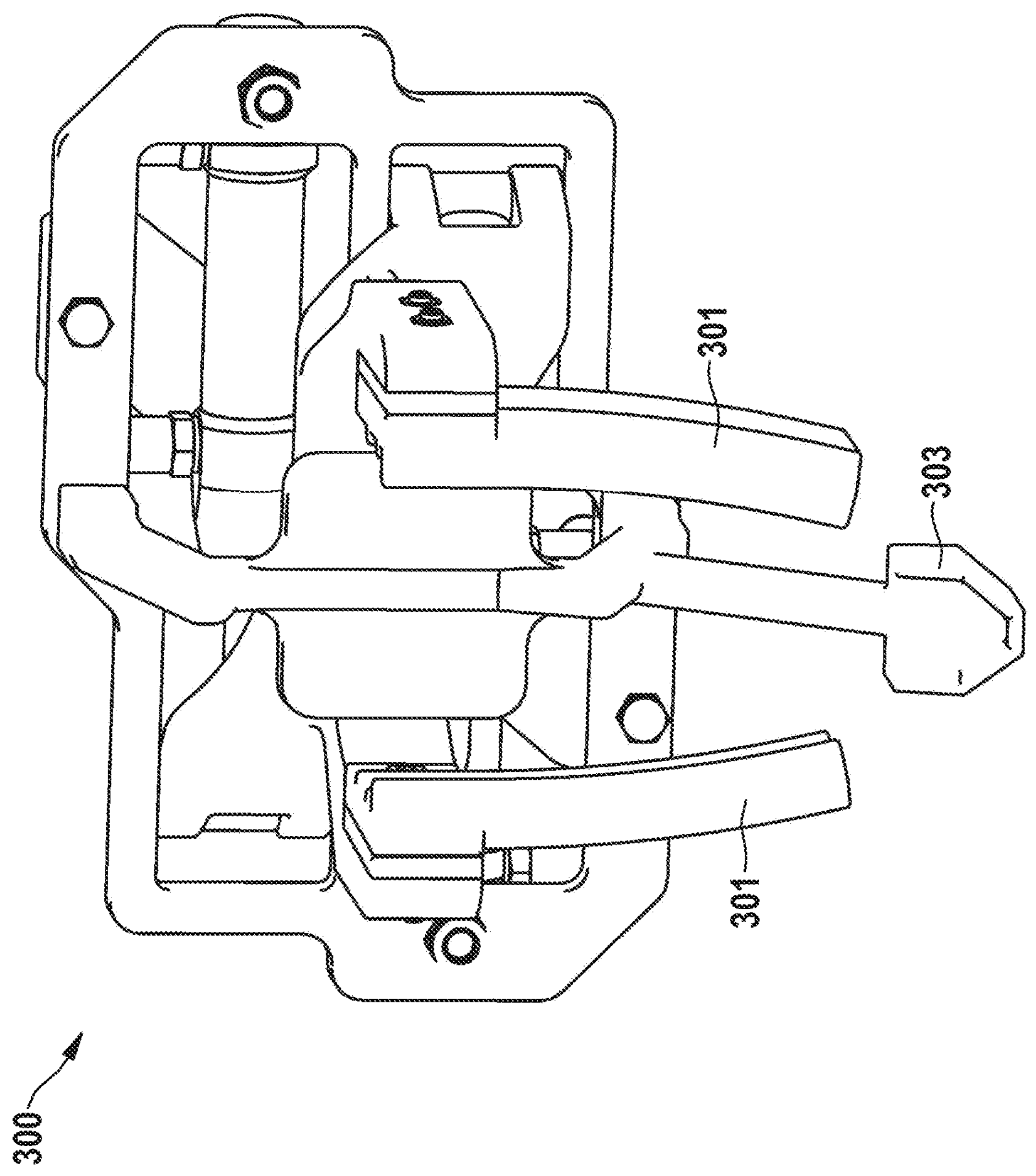
FIG. 3 is a perspective view of the gripper.
Figure 4:
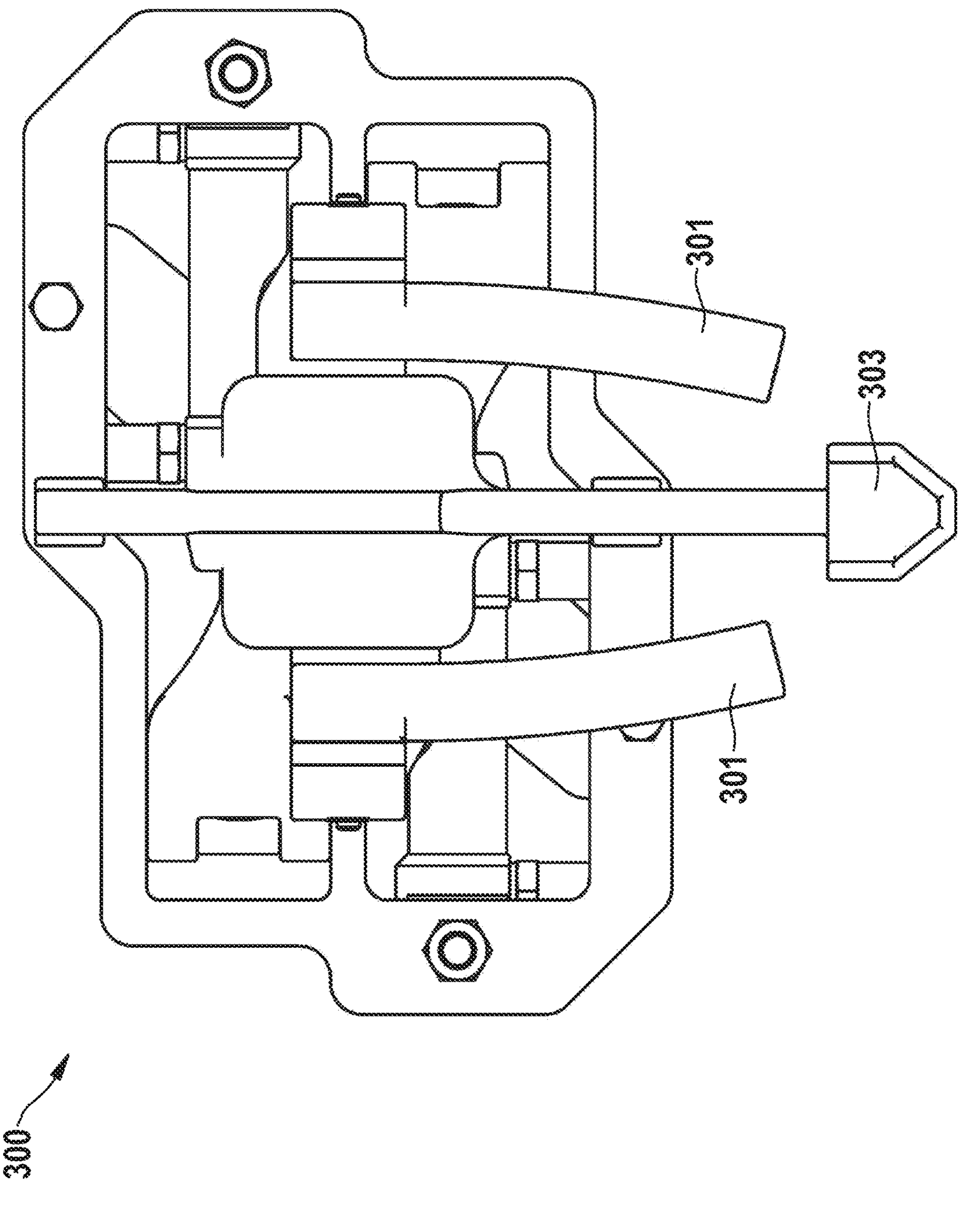
FIG. 4 is a plan view of the gripper.
Figure 5:
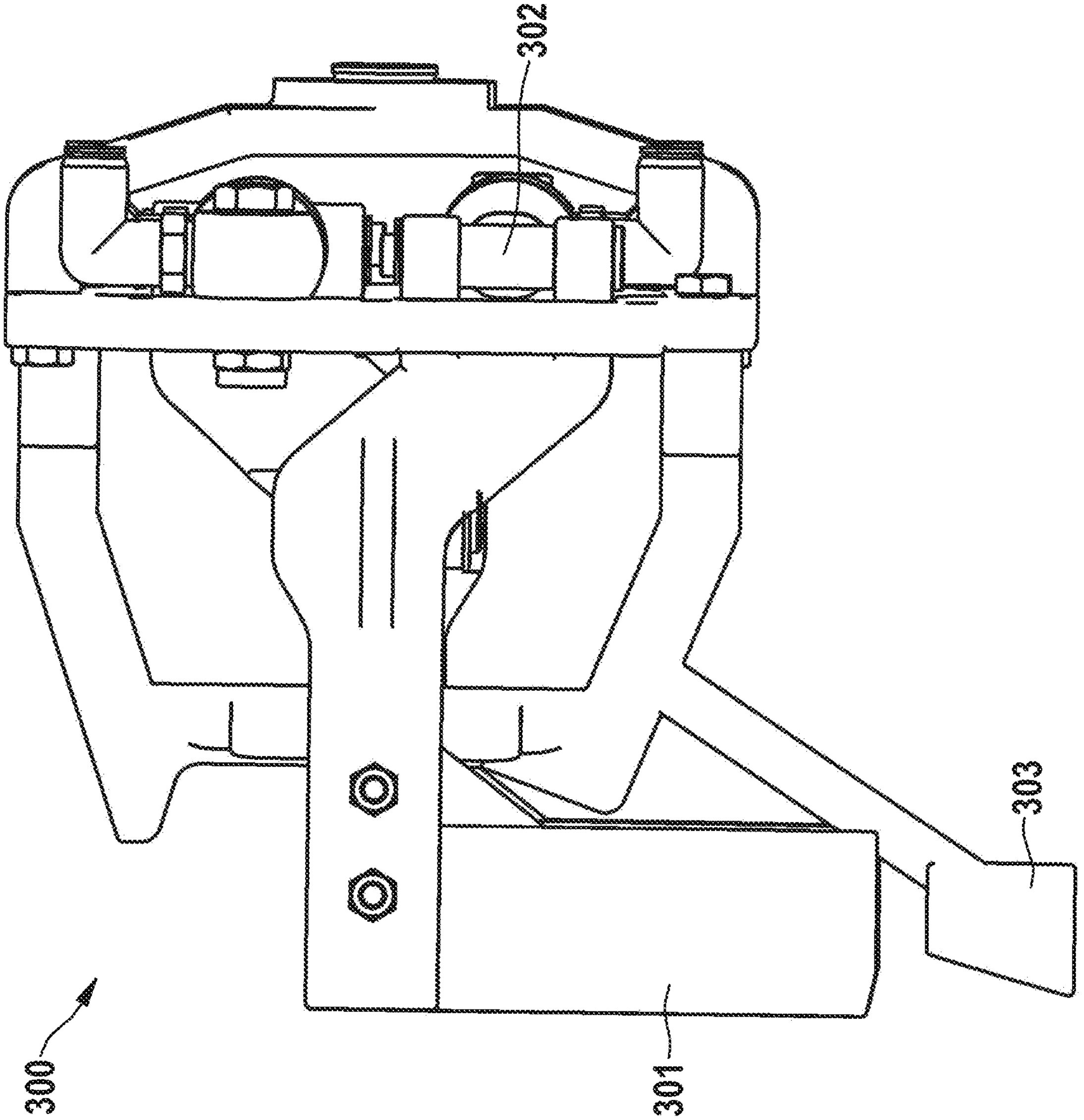
FIG. 5 is a side view of the gripper.

FIGS. 3 to 5 show an example of a controllable gripper 300 which is configured to grip and pick up the articles in order to subsequently arrange them fully automatically on the support body. The exemplary gripper 300 shown in FIGS. 3-5 is specially configured and adapted to pick up poultry breast caps.

However, as mentioned hereinbefore, the present invention is not limited solely to articles consisting of poultry breast caps. It is possible to pick up any other curved article in the food processing industry by means of a gripper 300 and to feed it to a support body, the gripper 300 preferably being suitably adapted to the geometry of the articles to be processed.

The gripper 300 is adapted to be controllable and is moved towards the article in step 146. The gripper 300 is moved against the direction of the normal vector 200 before it comes into contact with the article. This ensures that the gripper 300 approaches the article without collision in order to reliably grip and hold it.

As can be seen from FIGS. 3 to 5, the gripper 300 has controllably movable gripping elements 301 which are configured and adapted to pick up and hold the article. In the gripper 300 shown in the Figures, which—as already mentioned—is adapted to pick up poultry breast caps, the gripping elements 301 are configured as flank gripping elements which hold the poultry breast cap in a lateral clamping position while picking it up.

The poultry breast caps are usually conveyed to the gripper 300 by means of a conveyor belt (not shown in the drawing). Preferably, the poultry breast caps are already pre-aligned on this conveyor belt in such a way that they come to lie in a disorderly fashion, but are at least oriented with the convexly curved article side, that is to say, the breast fillet outer side, lying uppermost. This ensures that all poultry breast caps can be detected and picked up fully automatically according to the invention. However, such pre-alignment of the poultry breast caps is not necessarily required. Thus, it is also possible that the poultry breast caps are arranged on the conveyor belt in a disorderly fashion with regard to the orientation of the fillet side and visceral side. In this case, all of the poultry breast caps which are on the conveyor belt with their fillet side lying uppermost are first processed according to the invention. The poultry breast caps remaining on the conveyor belt are then fed to a further processing step in which the orientation of the poultry breast caps remaining on the conveyor belt is changed so that they come to lie with the visceral side on the conveyor belt. This further processing step can be manual or automatic.

In either case, it is first necessary to synchronise the movement of the gripper 300 with the movement of the conveyor belt in order to then move the gripper 300 towards the breast cap in the opposite direction to the normal vector and pick it up in the manner previously described. This takes place in step 148 shown in FIG. 1. The article is then gripped and picked up by the gripper 300 in step 150.

After the article has been picked up by the gripper 300 in the manner described, the movement of the gripper 300 is synchronised with the movement of the support elements in step 152.

The article is then saddled 154 on the support body by moving the gripper 300 together with the article towards the support body. In this way, the article is arranged on the support body by means of the gripper 300. In the saddling step 154 the article is arranged on the support body by means of the gripper 300, and finally the controllably movable gripping elements 301 are actuated so as to transfer the article to the support body, so that the gripper 300 is released or freed from the article and is ready to receive another article.

The present invention is particularly suitable for articles which are poultry breast caps arranged with their visceral side on the support body. The visceral side of poultry breast caps refers to the inner side, that is to say, the side facing the abdominal cavity, while the outer side of the poultry breast cap forms an at least essentially convex surface curved in the direction of the normal vector.

As mentioned hereinbefore, the present invention also includes a corresponding apparatus for determining the position of curved articles. To avoid repetition, in connection with the apparatus according to the invention, reference is made to the corresponding method according to the invention. The detection device and/or the processing unit are configured and adapted to carry out the aforementioned process steps.

Therefore, the apparatus according to the invention preferably comprises a detection device (not shown in the drawing) which is configured and adapted to scan the article to generate point cloud data representing the spatial surface structure of the article.

The apparatus according to the invention further comprises a processing unit (not shown in the drawing), the processing unit being configured to select a central point from the point cloud data and to determine a partial point cloud from the points of the point cloud data whose positions lie within a predefined distance around the central point.

The processing unit is further adapted to calculate the principal orientation of the partial point cloud for at least two spatial directions by determining the two associated spatial position vectors and a partial surface normal vector describing a partial surface based on the determined spatial position vectors that is perpendicular to both spatial position vectors, and to mark the points present in the partial point cloud in the point cloud data as already processed points.

The processing unit is further configured to repeat the aforementioned steps for further points of the point cloud data which are not identified as already processed points until a predefined proportion of the points have been processed, and is adapted to select a predefined number of the calculated partial surface normal vectors and to determine the overall orientation of the article by calculating a normal vector 200 based on the selected partial surface normal vectors.

The processing unit preferably comprises a random number generator adapted to randomly select the central points. Further preferably, the processing unit comprises a centre-of-gravity-determining unit which—as previously described in connection with the method according to the invention—is adapted to determine the centre of gravity of the point cloud, taking into account all points of the point cloud data, and the processing unit further comprises a selection unit which is configured, when selecting the calculated partial surface normal vectors, to select those with the shortest distance between their central point and the centre.

Further preferably, the selection unit is adapted, when selecting the partial surface normal vectors, to select only a predefined number of partial surface normal vectors to determine the normal vector.

Advantageously, the processing device is configured to render the spatial coordinates of the points present in the partial point cloud mean-free according to the methods and process according to the invention.

The processing device is preferably configured to determine a covariance matrix of the mean-free spatial coordinates and their eigenvalues in order to calculate the partial surface normal vector, and, for the two largest eigenvalues, is adapted to calculate the associated eigenvectors which form the at least two associated spatial position vectors for the principal orientation of the partial point cloud. For details concerning the determination of the partial surface normal vectors, reference is made to our above explanations in connection with the method according to the invention.

The processing device preferably comprises a masking unit (also not shown in the drawing) which is adapted to mask out points in the point cloud data whose distance from the detection device exceeds a predefined maximum distance, as described in connection with step 102 of the method according to the invention.

Further preferably, the processing unit comprises a noise filter (not shown in the drawing) which is adapted to subject the point cloud data to noise filtering according to the process steps described above.

As already described in connection with the apparatus according to the invention, the noise filter is configured to adjust the degree of noise filtering depending on the distance of the respective points of the point cloud data from the detection device.

The present invention also comprises an arrangement for automatically saddling curved articles in the food processing industry. The mode of operation of the arrangement according to the invention results from the method described further above for the automatic saddling of curved articles, so that reference is here made to the above explanations also in connection with the arrangement according to the invention.

The arrangement comprises at least one support body adapted to receive and hold the article, as well as the apparatus described above for determining the position of curved articles in the food processing industry, which is configured and adapted to calculate the overall orientation of the article by determining a normal vector 200 as described above.

The arrangement further comprises the controllably movable gripper 300 that is configured to be movable towards the article, the gripper 300 being moved at any rate against the direction of the normal vector 200 before it comes into contact with the article.

The arrangement also comprises a control device adapted to actuate controllably movable gripping elements 301 of the gripper 300 in order to pick up and hold the article, the control device being further adapted to move the gripper 300 together with the article towards the support body, to arrange the article on the support body by means of the gripper 300, and to actuate the controllably movable gripping elements 301 to release the article arranged on the support body.

Preferably, the articles are poultry breast caps which are arranged with their skeletal side or visceral side on the support body.

As already mentioned, the gripping elements 301 are preferably configured as flank grippers and are adapted to grip the article laterally.

Further preferably, the gripping elements 301 are configured and adapted like tongs to swivel in a controllable fashion about a common axis of rotation 302.

In particular, the gripping elements 301 are adapted to be driven in a pneumatically controlled manner.

Advantageously, the gripper 300 comprises a support element 303 adapted to come into contact with the breast side of the poultry breast cap.

The invention claimed is:

1. A method for determining the position of curved articles in the food processing industry, comprising the following steps:

a) scanning the article by a detection device adapted to generate point cloud data representing a spatial surface structure of the article;

b) selecting a central point from the point cloud data and determining a partial point cloud from points of the point cloud data whose positions are within a predefined distance around the central point;

c) calculating a principal orientation of the partial point cloud for at least two spatial directions in the partial point cloud by determining two associated spatial position vectors;

d) calculating a partial surface normal vector describing a partial surface based on the determined spatial position vectors that is perpendicular to both spatial position vectors;

e) marking points in the point cloud data present in the partial point cloud as already processed points and repeating steps b) to d) for further points of the point cloud data which are not marked as already processed points until a predefined proportion of the points have been processed; and f) selecting a predefined number of the calculated partial surface normal vectors and calculating an overall orientation of the article by determining a normal vector based on the selected partial surface normal vectors;

wherein the spatial coordinates of the points present in the partial point cloud are rendered mean-free; and wherein, to calculate the partial surface normal vector, a covariance matrix of the mean-free spatial coordinates is calculated, whose eigenvalues are determined, wherein the associated eigenvectors are calculated for the two largest eigenvalues and form the at least two associated spatial position vectors for the principal orientation of the partial point cloud.

2. A method for automatically saddling curved articles in the food processing industry, comprising the following steps:

providing at least one support body adapted to receive and hold the article;

calculating an overall orientation of the article by determining a normal vector by:

a) scanning the article by a detection device adapted to generate point cloud data representing a spatial surface structure of the article;

b) selecting a central point from the point cloud data and determining a partial point cloud from points of the point cloud data whose positions are within a predefined distance around the central point;

c) calculating a principal orientation of the partial point cloud for at least two spatial directions in the partial point cloud by determining two associated spatial position vectors;

d) calculating a partial surface normal vector describing a partial surface based on the determined spatial position vectors that is perpendicular to both spatial position vectors;

e) marking points in the point cloud data present in the partial point cloud as already processed points and repeating steps b) to d) for further points of the point cloud data which are not marked as already processed points until a predefined proportion of the points have been processed; and f) selecting a predefined number of the calculated partial surface normal vectors and calculating an overall orientation of the article by determining a normal vector based on the selected partial surface normal vectors;

moving a controllable gripper towards the article, the gripper being moved at any rate against a direction of the normal vector before the gripper comes into contact with the article;

actuating controllably movable gripping elements of the gripper in order to pick up and hold the article;

moving the gripper together with the article towards the support body;

arranging the article by the gripper on the support body; and actuating the controllably movable gripping elements to release the article arranged on the support body.

3. The method according to claim 2, wherein the central points are selected at random.

4. The method according to claim 2, wherein the centre of gravity of the point cloud is determined taking into account all points of the point cloud data, and, when selecting the calculated partial surface normal vectors, those with a shortest distance between the central point and the centre of gravity are selected.

5. The method according to claim 4, wherein only a predefined number of partial surface normal vectors are used to determine the normal vector.

6. The method according to claim 2, wherein points in the point cloud data whose distance from the detection device exceeds a predefined maximum distance are masked out.

7. The method according to claim 2, wherein the point cloud data undergo noise filtering.

8. The method according to claim 7, wherein a degree of the noise filtering depends on a distance of the respective points of the point cloud data from the detection device.

9. The method according to claim 2, wherein the articles are poultry breast caps which are arranged with their visceral side on the support body.

10. An arrangement for automatically saddling curved articles in the food processing industry, comprising:

at least one support body adapted to receive and hold the article;

a controllably movable gripper that is configured to be movable towards the article, the gripper being moved at any rate against a direction of the normal vector before the gripper comes into contact with the article;

a control device adapted to actuate controllably movable gripping elements of the gripper in order to pick up and hold the article;

a detection device which is configured and adapted to scan the article to generate point cloud data representing a spatial surface structure of the article;

a processing unit configured to, along with the control device, perform the method of claim 2 with the gripper and the gripping elements.

11. An arrangement according to claim 10, wherein the articles are poultry breast caps which are arranged with their visceral side on the support body.

12. An arrangement according to claim 10, wherein the gripping elements are configured as flank grippers and are adapted to grip the article laterally.

13. An arrangement according to claim 12, wherein the gripping elements are configured and adapted like tongs to swivel in a controllable fashion about a common axis of rotation.

14. An arrangement according to claim 10, wherein the gripping elements are adapted to be driven in a pneumatically controlled manner.

15. An arrangement according to claim 10, wherein the gripper comprises a support element adapted to come into contact with the breast side of the poultry breast cap.

16. The method according to claim 2, wherein the spatial coordinates of the points present in the partial point cloud are rendered mean-free, and to calculate the partial surface normal vector, a covariance matrix of the mean-free spatial coordinates is calculated, whose eigenvalues are determined, wherein the associated eigenvectors are calculated for the two largest eigenvalues and form the at least two associated spatial position vectors for the principal orientation of the partial point cloud.

17. An apparatus for determining a position of curved articles in the food processing industry, comprising:

a detection device which is configured and adapted to scan the article to generate point cloud data representing a spatial surface structure of the article; and a processing unit, the processing unit being configured:

to select a central point from the point cloud data and to determine a partial point cloud from points of the point cloud data whose positions lie within a predefined distance around the central point;

to calculate a principal orientation of the partial point cloud for at least two spatial directions in the partial point cloud by determining two associated spatial position vectors;

to calculate a partial surface normal vector describing a partial surface based on the determined spatial position vectors that is perpendicular to both spatial position vectors; and to mark points present in the partial point cloud in the point cloud data as already processed points;

the processing unit being further configured;

to repeat the aforementioned steps for further points of the point cloud data which are not marked as already processed points; and to select a predefined number of the calculated partial surface normal vectors and calculate an overall orientation of the article by determining a normal vector based on the selected partial surface normal vectors;

wherein the processing unit is configured to render the spatial coordinates of the points present in the partial point cloud mean-free; and wherein the processing unit is configured to determine a covariance matrix of the mean-free spatial coordinates and their eigenvalues in order to calculate the partial surface normal vector, and, for the two largest eigenvalues, is adapted to calculate the associated eigenvectors which form the at least two associated spatial position vectors for the principal orientation of the partial point cloud.

18. The apparatus according to claim 17, wherein the processing unit comprises a random generator that is adapted to randomly select the central points.

19. The apparatus according to claim 17, wherein:

the processing unit comprises a centre-of-gravity-determining unit that is adapted to determine the centre of gravity of the point cloud, taking into account all points of the point cloud data; and the processing unit further comprises a selection unit which is configured, when selecting the calculated partial surface normal vectors, to select those with a shortest distance between their central point and the centre of gravity.

20. The apparatus according to claim 19, wherein, when selecting the partial surface normal vectors, the selection unit is adapted to use only a predefined number of partial surface normal vectors to determine the normal vector.

21. The apparatus according to claim 17, wherein the processing unit comprises a masking unit that is adapted to mask out points in the point cloud data whose distance from the detection device exceeds a predefined maximum.

22. The apparatus according to claim 17, wherein the processing unit comprises a noise filter that is adapted to subject the point cloud data to noise filtering.

23. The apparatus according to claim 22, wherein a degree of the noise filtering depends on a distance of the respective points of the point cloud data from the detection device.

* * * * *